United States Patent
Heo et al.

(10) Patent No.: US 8,116,270 B2
(45) Date of Patent: Feb. 14, 2012

(54) METHOD AND APPARATUS FOR TRANSMITTING AND RECEIVING CHANNEL QUALITY INDICATOR IN COMMUNICATION SYSTEM

(75) Inventors: Youn-Hyoung Heo, Suwon-si (KR); Ju-Ho Lee, Suwon-si (KR); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 827 days.

(21) Appl. No.: 12/138,698

(22) Filed: Jun. 13, 2008

(65) Prior Publication Data

US 2008/0310360 A1    Dec. 18, 2008

(30) Foreign Application Priority Data

Jun. 13, 2007  (KR) .................. 10-2007-0057849
Jun. 20, 2007  (KR) .................. 10-2007-0060789

(51) Int. Cl.
*H04W 4/00*  (2009.01)
(52) U.S. Cl. ....................................... 370/329
(58) Field of Classification Search ................. None
See application file for complete search history.

(56) References Cited

U.S. PATENT DOCUMENTS

| | | | |
|---|---|---|---|
| 2007/0153727 A1* | 7/2007 | McBeath et al. | 370/329 |
| 2007/0171849 A1* | 7/2007 | Zhang et al. | 370/310 |
| 2008/0043706 A1* | 2/2008 | Reznik | 370/347 |
| 2008/0049712 A1* | 2/2008 | Terabe et al. | 370/348 |
| 2008/0268785 A1* | 10/2008 | McCoy et al. | 455/67.11 |
| 2010/0027450 A1* | 2/2010 | Montojo et al. | 370/311 |

\* cited by examiner

*Primary Examiner* — Chirag Shah
*Assistant Examiner* — Amar Persaud
(74) *Attorney, Agent, or Firm* — The Farrell Law Firm, P.C.

(57) ABSTRACT

A method and apparatus for transmitting/receiving a Channel Quality Indicator (CQI) in a communication system are provided. It is determined whether there is any uplink data to transmit, when a CQI transmission time arrives according to a predetermined CQI transmission period. If there is uplink data to transmit, a part of the uplink data is punctured to insert the CQI therein, and the inserted CQI is multiplexed with the uplink data before transmission. It is determined whether there is any uplink data to receive from a terminal, when a CQI reception time arrives according to a predetermined CQI transmission period. If there is uplink data to receive, the uplink data is received from the terminal, and the received uplink data is demultiplexed to extract the CQI.

16 Claims, 17 Drawing Sheets

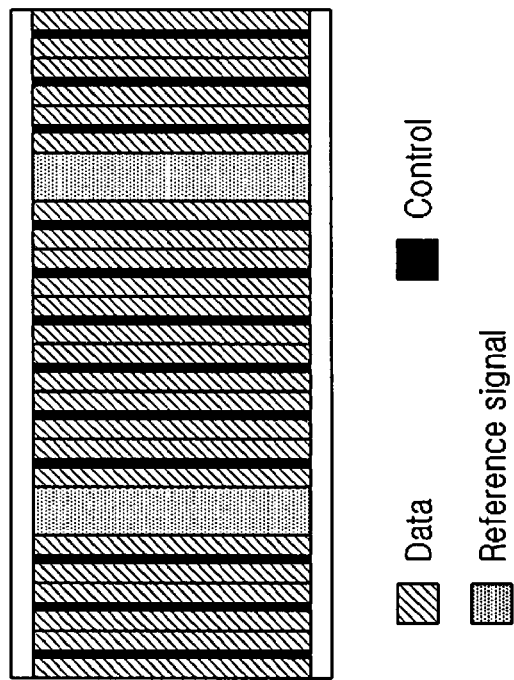
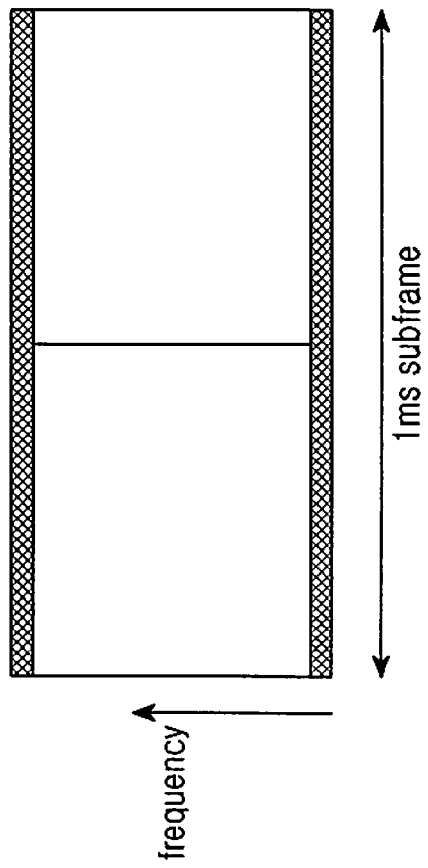
FIG.1B
FIG.1A

METHOD AND APPARATUS FOR TRANSMITTING AND RECEIVING CHANNEL QUALITY INDICATOR IN COMMUNICATION SYSTEM

PRIORITY

This application claims priority under 35 U.S.C. §119(a) to a Korean Patent Application filed in the Korean Intellectual Property Office on Jun. 13, 2007 and assigned Serial No. 2007-57849, and a Korean Patent Application filed in the Korean Intellectual Property Office on Jun. 20, 2007 and assigned Serial No. 2007-60789, the disclosures of both of which are incorporated herein by reference.

BACKGROUND OF THE INVENTION

1. Field of the Invention

The present invention relates generally to a communication system, and more particularly, to a method and apparatus for transmitting and receiving uplink control information.

2. Description of the Related Art

Intensive research is being conducted in the field of mobile communication systems on Orthogonal Frequency Division Multiplexing (OFDM), which is a scheme useful for high-speed data transmission in radio channels, and/or on Single Carrier—Frequency Division Multiple Access (SC-FDMA), which is a scheme similar thereto. In $3^{rd}$ Generation Partnership Project (3GPP), which is the asynchronous cellular mobile communication standard group, a study of a Long Term Evolution (LTE) system, which is the next generation mobile communication system, is being conducted based on the foregoing multiple access schemes.

In the LTE system, the term 'uplink Channel Quality Indicator (CQI) information' refers to channel quality-related information of a downlink, which is fed back from a terminal (s) to schedule downlink resources. CQI information necessary for scheduling may include:

Wideband CQI information: channel quality information of the entire bandwidth

Sub-band CQI information: channel quality information of a partial bandwidth. This is channel information necessary for frequency-selective scheduling.

Multiple Input Multiple Output (MIMO)-related CQI information: channel quality information for use of multiple antennas The scheduling scheme and multi-antenna scheme that a base station desires to use, and/or the type of CQI information necessary for channel conditions of terminals, can be different for each base station. In other words, when the base station uses frequency-selective scheduling and a channel condition of a terminal is good, the terminal can be allocated a good sub-band if it transmits sub-band CQI information.

Currently, to transmit a control channel such as ACK/NACK information for downlink data and CQI information, which are not directly related to data transmission on the uplink, LTE allocates a particular resource block to a control channel as shown in FIG. 1A. In order to distinguish multiple terminals in the resource block, LTE uses/transmits different codes for the terminals. When a terminal transmits control information over allocated frequency resources 101, it is impossible to simultaneously transmit control information and packet data. This is because the simultaneous transmission of packet data and control information in the same transmission interval may increase a Peak to Average Power Ratio (PAPR) as it may not satisfy the single carrier characteristic. Therefore, in the interval where the terminal transmits packet data, a signal on a control channel (e.g., Physical Uplink Control Channel (PUCCH)) is transmitted using frequency resources for a data channel (e.g., Physical Uplink Shared Channel (PUSCH)) as shown in FIG. 1B. In other words, packet data, control information and reference signal are transmitted after undergoing time multiplexing in the same frequency resources 102.

FIG. 2 illustrates a method of transmitting control channels when data exists and when no data exists in a system having the channel structure for control information transmission, shown in FIG. 1.

It is assumed in FIG. 2 that a terminal transmits CQI every 10 ms (See CQI transmit time 202) over PUSCH/PUCCH 201. At 203 and 204, since there is no packet data transmission, i.e., since there is no transmission on PUSCH, the terminal transmits CQI through resource blocks at both ends allocated for control channels. At 205 and 206, since there is transmission data, the terminal transmits data and CQI together using the resources allocated for data transmission.

The transmission method of FIG. 2 is useful for the case where the CQI information is small in amount and occurs periodically. However, in the case where the amount of CQI information is large, even though resources are allocated, the terminal may not use the allocated resources at the CQI transmission times 205 and 206, increasing the resource waste. Since the CQI requiring the great amount of information (e.g., sub-band CQI and MIMO-related information) is generally transmitted only after downlink data is generated and only when there is downlink data to transmit, it is preferable to transmit the necessary CQI information by upper layer signaling only when necessary, without periodically transmitting it.

The most-direct possible method for this is a method in which the base station provides information on frequency resources for CQI transmission every time it determines that there is a need for the frequency resources. However, for this, the base station should send a new resource allocation message for scheduling, and sending signaling only for this purpose may cause signaling overhead.

A method may also be considered which transmits CQI only when the terminal has data to transmit over the uplink. However, since there is no direct relation between the uplink data transmission method and the CQI transmission method, there is a need for a detailed terminal's operation of transmitting data and CQI in association with each other, in order to realize the methods.

SUMMARY OF THE INVENTION

The present invention has been made to address at least the above problems and/or disadvantages and to provide at least the advantages described below. Accordingly, an aspect of the present invention provides a method and apparatus for determining efficient CQI transmission times in an LTE system that time-multiplexes CQI information with packet data before their transmission.

Another aspect of the present invention provides a method for determining whether to make CQI transmission based on transmission/non-transmission of uplink data at a periodic CQI transmission time, and a transmission/reception apparatus therefor.

An additional aspect of the present invention provides a method for determining whether to make CQI transmission based on reception/non-reception of an uplink scheduling grant and/or on initial transmission indication at a periodic CQI transmission time, and a transmission/reception apparatus therefor.

A further aspect of the present invention provides a method for determining a CQI transmission time based on previous CQI transmission records, instead of determining the CQI transmission time at given periods.

According to one aspect of the present invention, a method for transmitting a Channel Quality Indicator (CQI) in a communication system is provided. It is determined whether there is any uplink data to transmit, when a CQI transmission time arrives according to a predetermined CQI transmission period. When there is uplink data to transmit, a part of the uplink data is punctured to insert the CQI therein, the inserted CQI is multiplexed with the uplink data, and the multiplexed CQI and uplink data are transmitted.

According to another aspect of the present invention, a method for receiving a Channel Quality Indicator (CQI) in a communication system is provided. It is determined whether there is any uplink data to receive from a terminal, when a CQI reception time arrives according to a predetermined CQI transmission period. When there is uplink data to receive, the uplink data is received from the terminal, and the received uplink data is demultiplexed to extract the CQI.

According to an additional aspect of the present invention, a terminal apparatus is provided for transmitting a Channel Quality Indicator (CQI) in a communication system. The terminal apparatus includes a packet data generator for generating packet data according to scheduling information received from a base station, and a CQI information generator for generating a CQI The terminal apparatus further includes a multiplexer for multiplexing the CQI received from the CQI information generator and the packet data received from the packet data generator, and transmitting the multiplexed result to the base station. When a CQI transmission time arrives according to a predetermined CQI transmission period, the CQI information generator determines whether there is any uplink data to transmit to the base station, and if there is uplink data to transmit, outputs the generated CQI.

According to a further aspect of the present invention, a base station apparatus is provided for receiving a Channel Quality Indicator (CQI) in a communication system. The base station apparatus includes a demultiplexer for demultiplexing multiplexed data received from a terminal to extract a CQI, and a data reception controller for controlling reception of the data according to scheduling information generated by a scheduler. The base station apparatus also includes a packet data demodulator for demodulating packet data received from the demultiplexer under control of the data reception controller, a CQI reception controller for controlling demodulation of the CQI extracted by the demultiplexer, and a CQI information demodulator for demodulating the CQI received from the demultiplexer under control of the CQI reception controller. When a CQI reception time arrives according to a predetermined CQI transmission period, the CQI reception controller determines whether there is any uplink data to receive from a terminal, and if there is uplink data to receive, controls the CQI information demodulator to demodulate the CQI.

BRIEF DESCRIPTION OF THE DRAWINGS

The above and other aspects, features and advantages of the present invention will become more apparent from the following detailed description when taken in conjunction with the accompanying drawings in which:

FIGS. 1A and 1B are diagrams illustrating transmission schemes for control information in a 3GPP LTE system;

DETAILED DESCRIPTION OF THE PREFERRED EMBODIMENTS

Figure 2:
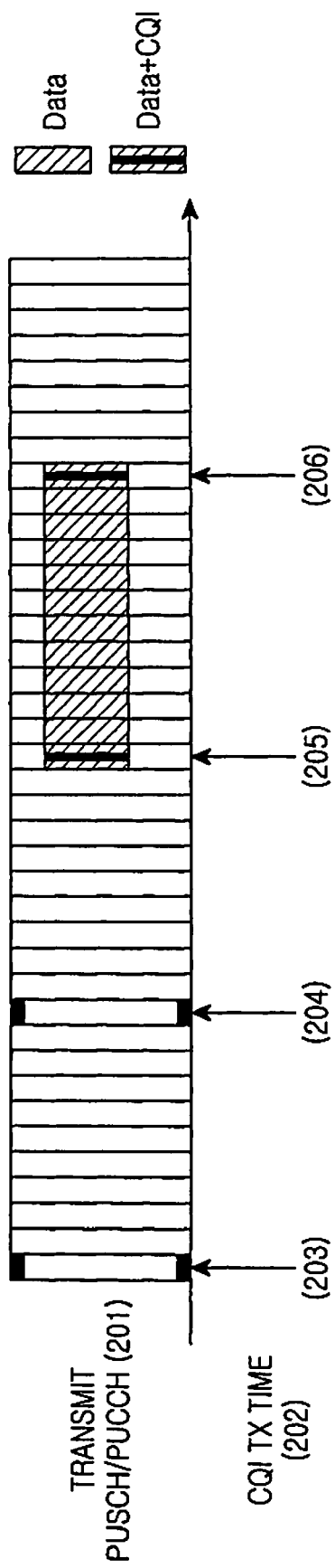
FIG. 2 is a diagram illustrating a CQI transmission scheme now under discussion in the 3GPP LTE system.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

The present invention provides a method for setting a transmission period when a terminal intends to transmit information necessary for scheduling using some of uplink data transmission resources, instead of previously allocating uplink resources when the terminal desires to transmit information necessary for scheduling for downlink data transmission, and for determining whether to make CQI transmission based on the set transmission period and information related to the uplink data transmission.

A first embodiment of the present invention sets a CQI transmission period of a terminal, and determines presence/absence of resources for uplink data transmission at every corresponding CQI transmission time. When there are resources available for uplink data transmission, the first embodiment punctures a part of data to insert CQI information therein, and multiplexes the inserted CQI information with uplink data before transmission.

Figure 3A:
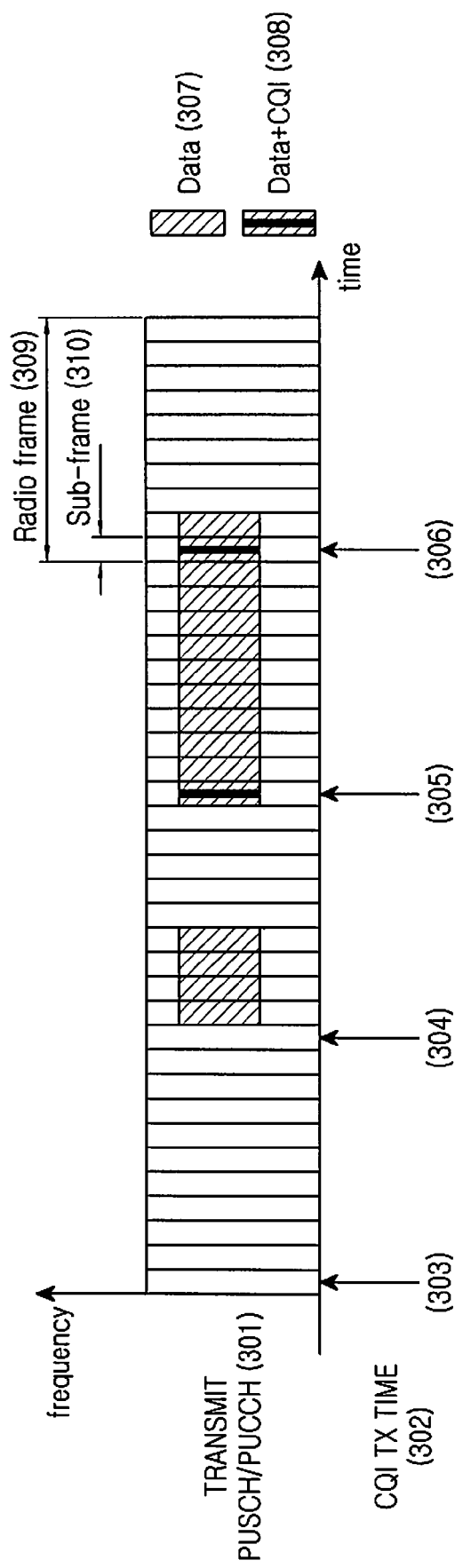
FIG. 3A is a diagram illustrating a CQI transmission scheme according to a first embodiment of the present invention.

FIG. 3A illustrates a CQI transmission scheme according to the first embodiment of the present invention. In FIG. 3A, the horizontal axis represents the time domain, and the vertical axis presents the frequency domain of transmission over PUSCH/PUCCH 301. One rectangle represents one Transmission Time Interval (TTI) as a basic transmission unit, referred to as one sub-frame 310 of radio frame 309. In LTE, one TTI is assumed as 1 ms, and it occupies a size of allocated frequency resources along the frequency domain. FIG. 3A shows only uplink transmission of one terminal. The hatched parts represent the frequency region (or frequency band) allocated to the terminal in the entire frequency region, and the remaining frequency regions will be allocated to other terminals. The region composed of only the hatched parts represents transmission of only packet data, while the region mixed of hatched parts and black strips represents multiplexing of data transmission and CQI transmission. It is assumed in FIG. 3A that a CQI transmission period 302 of the terminal is 10 TTIs.

According to the first embodiment of the present invention, the terminal determines presence/absence of uplink data transmission at every $10^{th}$ sub-frame 310. At 303 and 304, since there is no uplink data transmission 307, the terminal transmits no CQI. At 305 and 306, since there is uplink data transmission, the terminal multiplexes CQI and uplink data 308 before transmission.

However, when the terminal determines the presence/absence of uplink data transmission once every CQI transmission period as shown in FIG. 3, the terminal cannot make CQI transmission even though uplink data transmission starts from the sub-frame just after 304. In order to transmit CQI, the terminal should wait until the next CQI transmission time. This situation may occur because the terminal can start uplink data transmission at an arbitrary time. Therefore, in order to allow the terminal to rapidly transmit CQI even in this case, it is necessary to extend, in defining a CQI transmission period, the time required for determining whether to make CQI transmission to a predetermined interval (hereinafter referred to as 'CQI transmission-available interval'), rather than determining whether to make CQI transmission only within one sub-frame corresponding to the CQI transmission time.

Figure 3B:
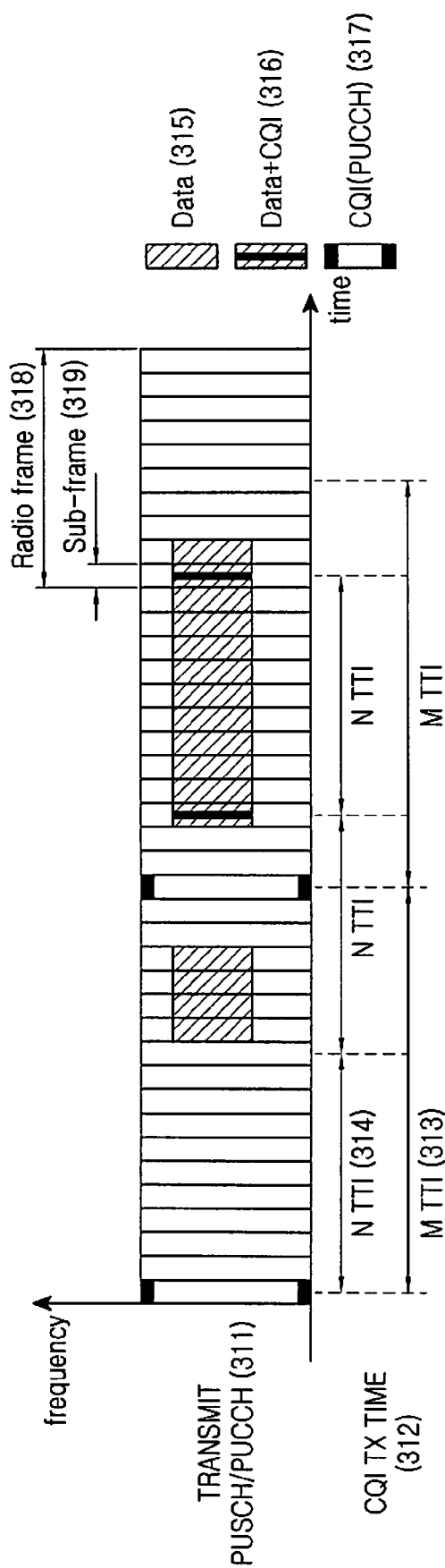
FIG. 3B is a diagram illustrating a case in which the conventional PUCCH-based CQI transmission and the new CQI transmission based on the first embodiment of the present invention are both set for one terminal.

FIG. 3B shows a case of setting both the conventional PUCCH-based CQI transmission and the new CQI transmission based on the first embodiment of the present invention, for one terminal.

The horizontal axis represents the time domain, and the vertical axis presents the frequency domain of transmission over PUSCH/PUCCH 311. One rectangle represents one Transmission Time Interval (TTI) as a basic transmission unit, referred to as one sub-frame 319 of radio frame 318. It is assumed in FIG. 3B that a CQI transmission period 312 of the terminal is 10 TTIs.

Various types of CQI information are needed to support downlink scheduling. The average reception quality in the entire system bandwidth has a small amount of information. A large amount of information should be transmitted to report a reception quality for each sub-band. It is possible to use a method of transmitting a small amount of CQI information through PUCCH and transmitting a large amount of CQI information together with data using data resources. As shown in FIG. 3B, it is possible to transmit various types of CQIs by setting channels such that CQI transmitted using PUCCH 317 is transmitted every M TTIs (See 313) and CQI transmitted together with data using PUSCH 316 is transmitted every N TTIs (See 314). Data 315 may also be transmitted as in FIG. 3A.

Figure 4:
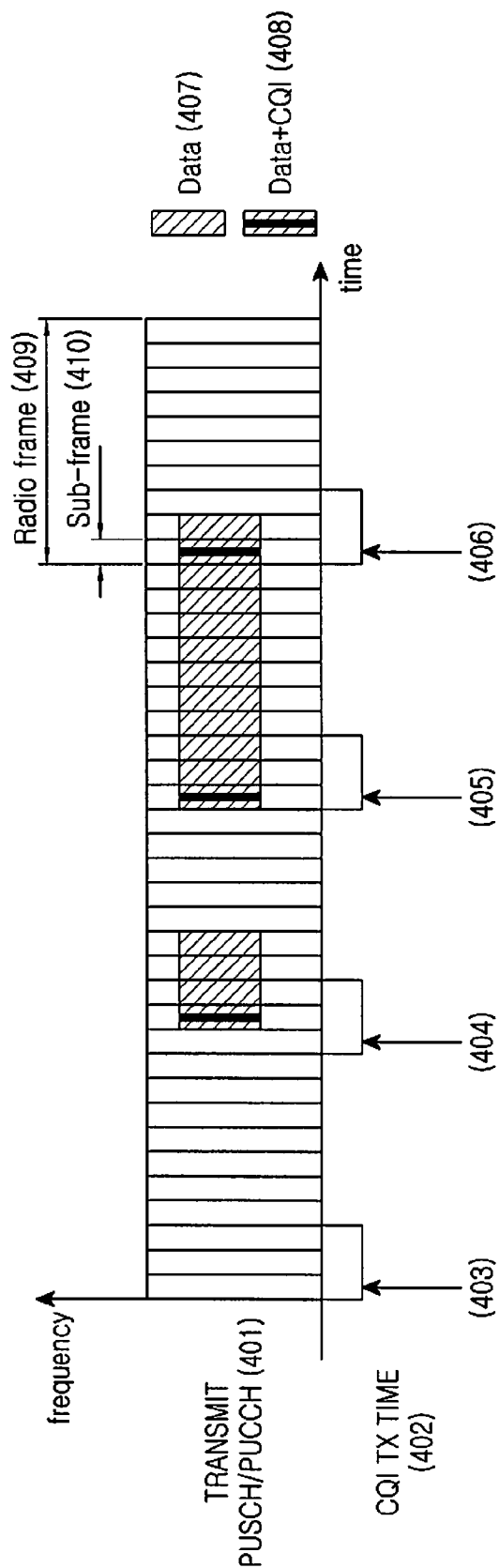
FIG. 4 is a diagram illustrating another example of CQI transmission according to the first embodiment of the present invention.

FIG. 4 illustrates another example of CQI transmission according to the first embodiment of the present invention.

The CQI transmission scheme of FIG. 4, which is similar to that of FIG. 3, determines whether to make CQI transmission by determining the presence/absence of uplink data transmission not only at the $10^{th}$ sub-frame 410 of radio frame 409, which is every CQI transmission time based on the CQI transmission period, but also during a total of 3 sub-frames 403, 404, 405, 406, beginning from a corresponding sub-frame of every CQI transmission time till its two succeeding sub-frames. The horizontal axis represents the time domain, and the vertical axis presents the frequency domain of transmission over PUSCH/PUCCH 401. It is assumed in FIG. 3B that a CQI transmission period 402 of the terminal is 10 TTIs.

That is, at the sub-frame just after 304 of FIG. 3A, only the uplink data is transmitted even though there is a need to transmit CQI. However, in FIG. 4, as the CQI transmission-available interval is additionally defined, instead of only uplink data 407, uplink data and CQI 408 are transmitted after undergoing multiplexing at the sub-frame just after 404. The CQI transmission-available interval, which can be set variably, can be set by upper layer signaling, like the transmission period parameter. Alternatively, a fixed value previously defined in the specification can also be used as the CQI transmission-available interval.

A detailed description will now be made of a method for determining a CQI transmission time according to the first embodiment of the present invention.

A parameter indicating a CQI transmission period is denoted as 'X' and a parameter indicating a CQI transmission-available interval is denoted as 'Y'. For X, a base station determines X corresponding to the necessary frequency according to a channel condition of a terminal or according to a scheduling algorithm, and sets it as upper layer signaling. When there is the parameter Y, a $k^{th}$ sub-frame through a $(k+Y)^{th}$ sub-frame, satisfying the following condition, constitute a transmission time where CQI transmission is possible. This can be expressed as Equation (1).

$$(10 \times CFN + k) \bmod X = 0 \tag{1}$$

where Connection Frame Number (CFN) denotes a sequence number of a radio frame, which is a value increasing by one as every radio frame is counted, and k denotes a position of a corresponding sub-frame in a radio frame. As can be seen in FIGS. 3A, 3B and 4, in LTE, there are 10 sub-frames in one radio frame.

Figure 5:
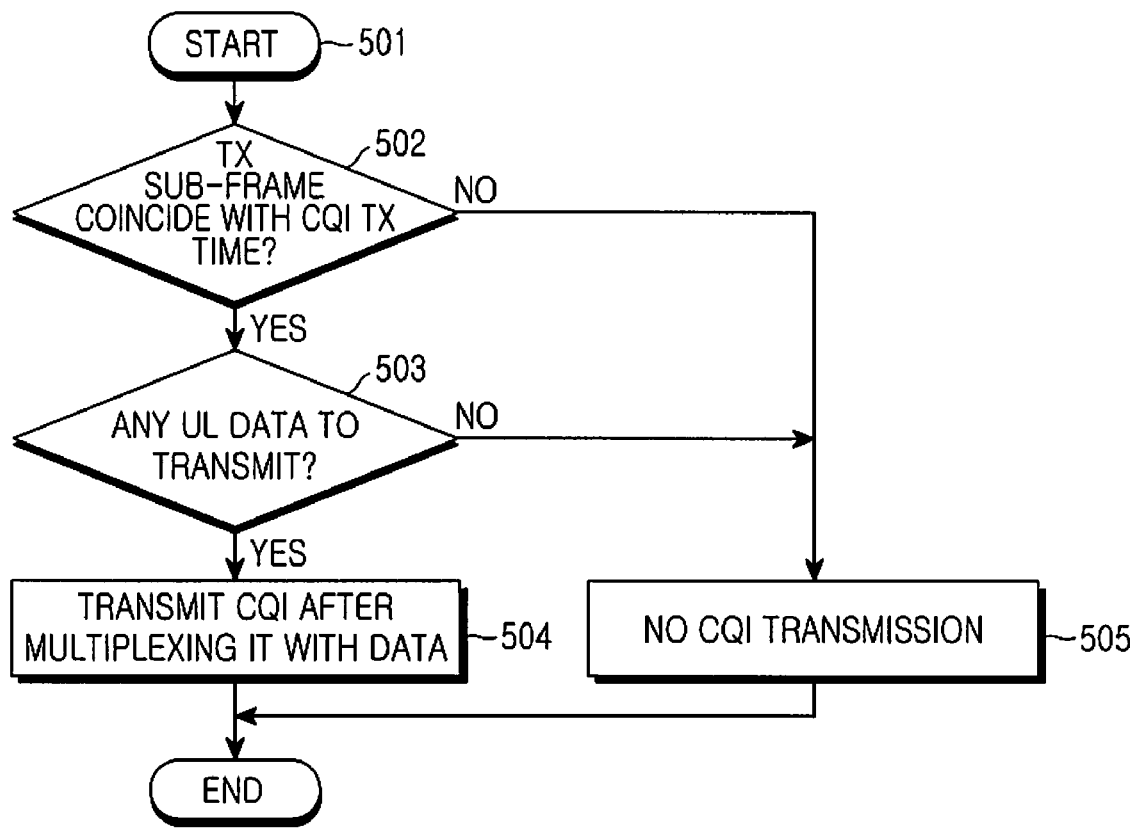
FIG. 5 is a diagram illustrating an operating procedure of a terminal according to the first embodiment of the present invention.

FIG. 5 illustrates an operating procedure of a terminal according to the first embodiment of the present invention.

Referring to FIG. 5, after the methodology begins in step 501, a terminal determines in step 502 whether the time it desires to transmit CQI is coincident with a predetermined CQI transmission time. The coincidence between the desired transmission time and the CQI transmission time is determined using the foregoing CQI transmission time decision method. That is, when the desired transmission time is coincident with the CQI transmission time, the terminal proceeds to step 503 where it determines if there is any uplink data to transmit. If there is uplink data to transmit, the terminal multiplexes the uplink data and CQI before transmission in step 504. However, if the desired transmission time is not coincident with the predetermined CQI transmission time, or if there is no uplink data to transmit, the terminal proceeds to step 505 where it makes no CQI transmission.

Figure 6:
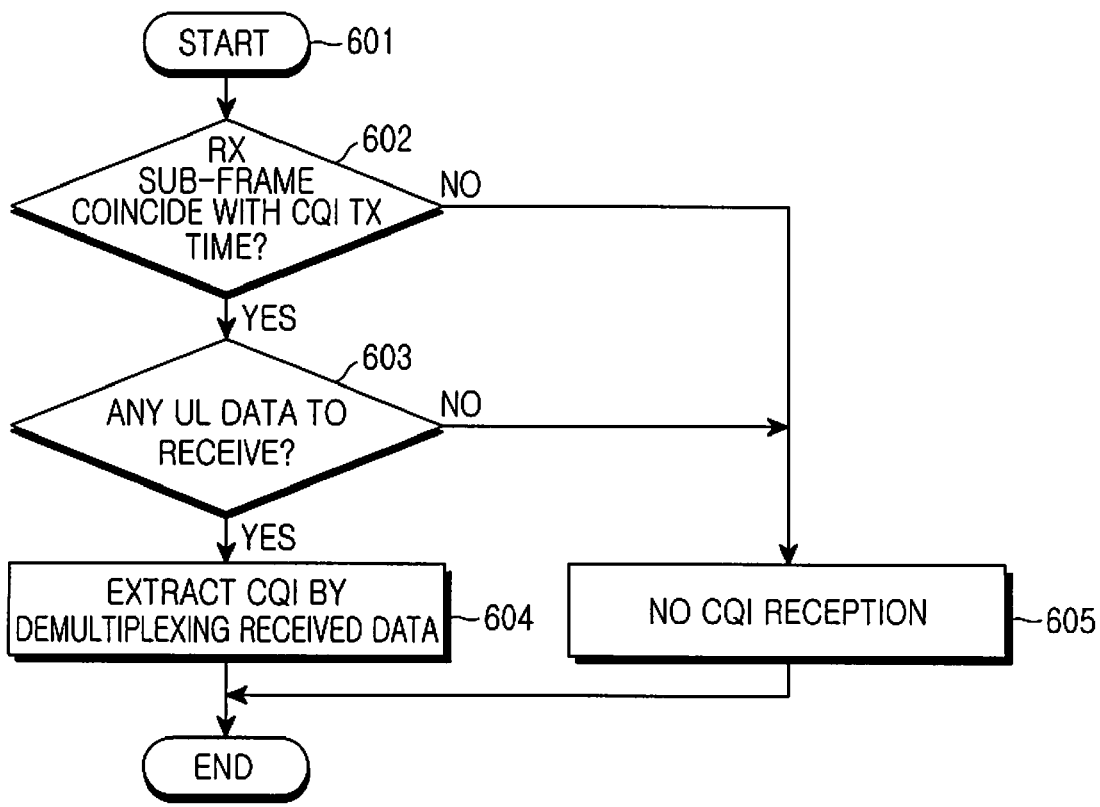
FIG. 6 is a diagram illustrating an operating procedure of a base station according to the first embodiment of the present invention.

FIG. 6 illustrates an operating procedure of a base station according to the first embodiment of the present invention.

Referring to FIG. 6, after the methodology begins in block 601, a base station determines in step 602 whether the sub-frame where it has received uplink data is coincident with a CQI reception time. Since the CQI transmission time at the terminal is equal to the CQI reception time at the base station, the coincidence between the sub-frame and the CQI reception time is determined using the foregoing CQI transmission time decision method. If it is determined that the sub-frame corresponds to the CQI transmission time of the terminal, the base station proceeds to step 603 where it determines if there is any uplink data to receive from the corresponding terminal. If there is uplink data to receive, the base station proceeds to step 604 where it receives the uplink data and demultiplexes the received uplink data to extract CQI. However, if the sub-frame is not coincident with the CQI transmission time of the terminal, or if there is no uplink data to receive from the terminal, the base station proceeds to step 605 where it receives no CQI.

Figure 7:
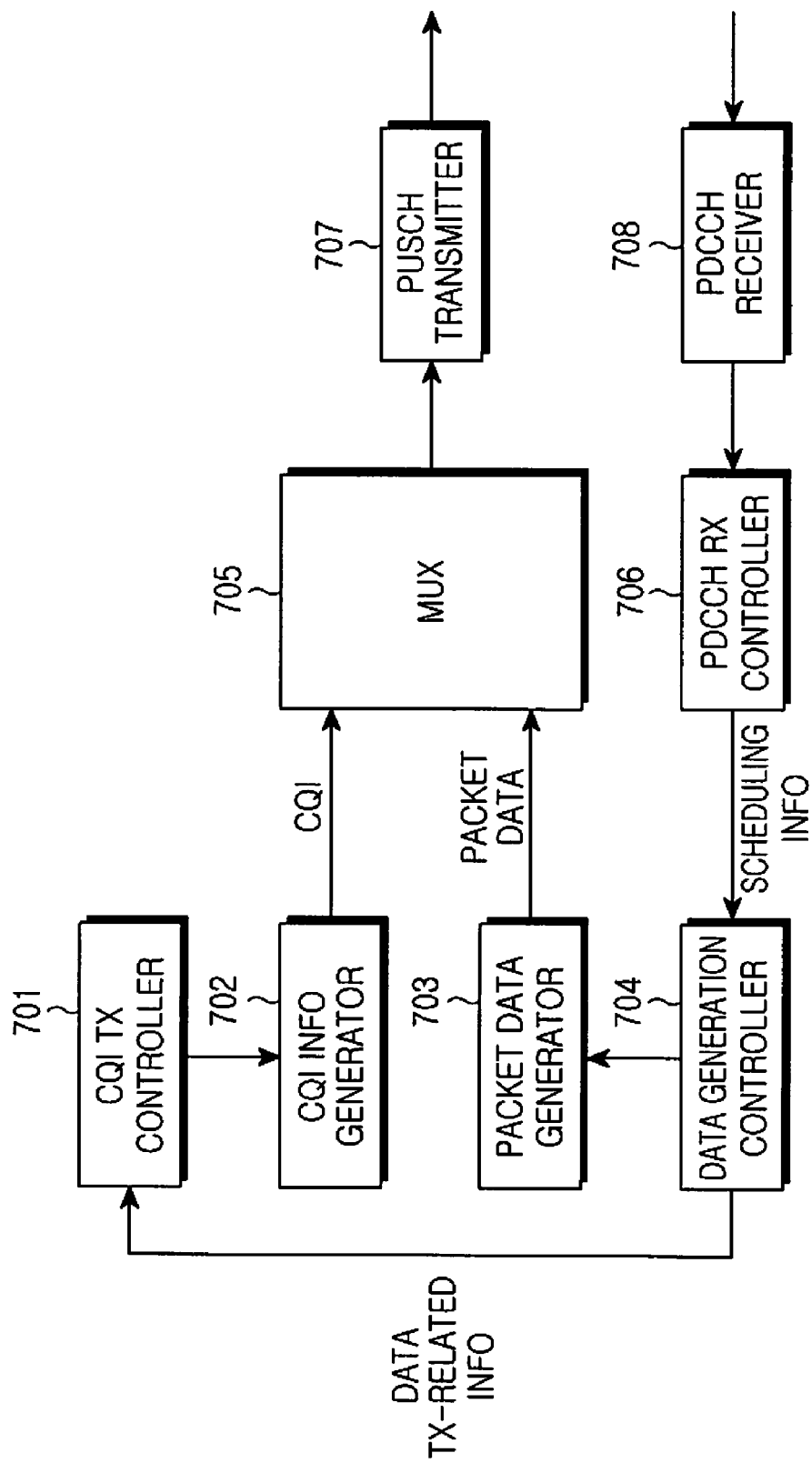
FIG. 7 is a diagram illustrating a transmission apparatus of a terminal according to the first embodiment of the present invention.

FIG. 7 illustrates a transmission apparatus of a terminal according to the first embodiment of the present invention.

Referring to FIG. 7, a CQI transmission controller 701 receives data transmission-related information provided from a data generation controller 704 to determine whether there is any data to transmit over the uplink at a CQI transmission time. A CQI information generator 702, under the control of the CQI transmission controller 701, generates CQI and delivers it to a multiplexer 705. A packet data generator 703, under the control of the data generation controller 704, generates packet data and delivers it to the multiplexer 705. The multiplexer 705 time-multiplexes the CQI and the packet data, and transmits the result by means of a PUSCH transmitter 707. A Physical Downlink Control Channel (PDCCH) receiver 708 receives data over PDCCH, and delivers the received data to a PDCCH reception controller 706. The PDCCH reception controller 706 extracts scheduling information from the data provided from the PDCCH receiver 708, and delivers the extracted scheduling information to the data generation controller 704.

Figure 8:
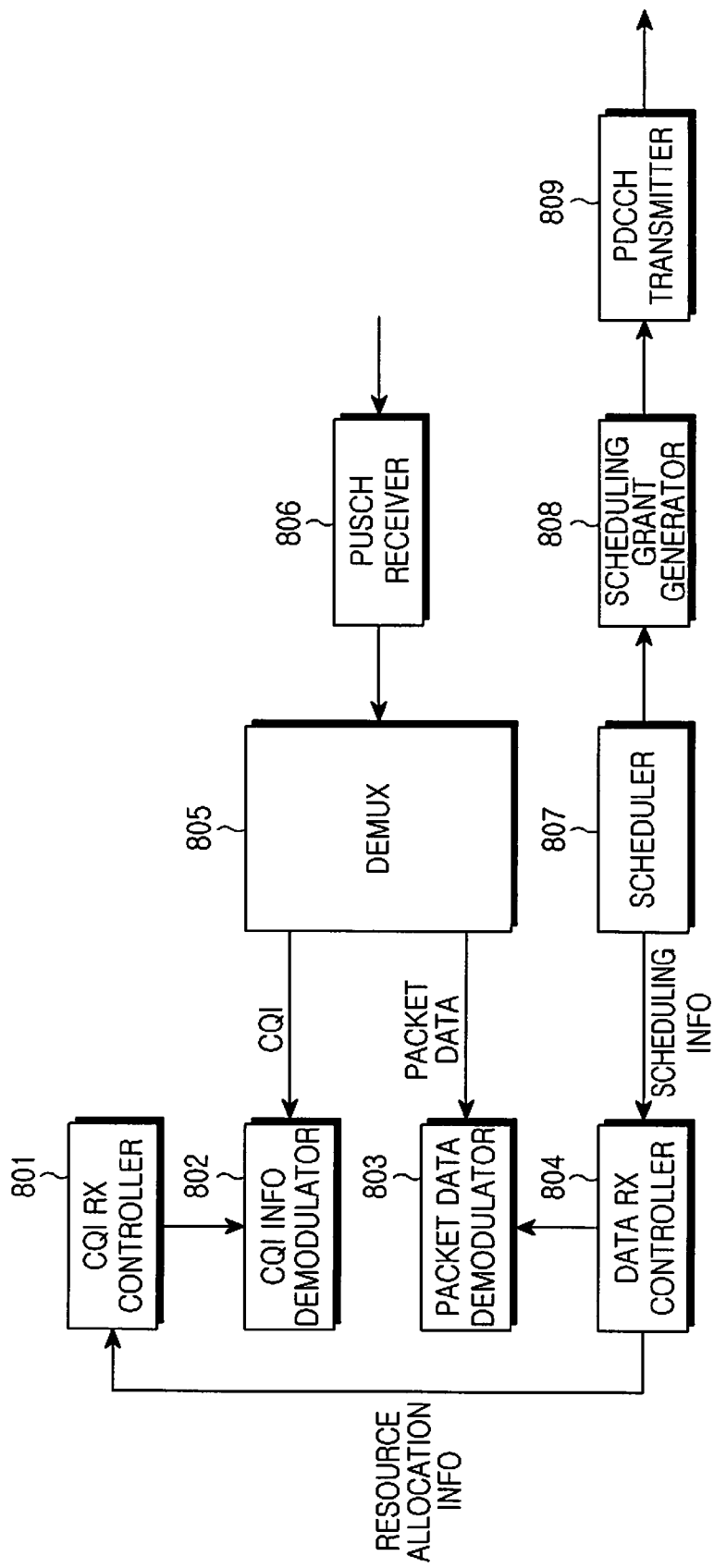
FIG. 8 is a diagram illustrating a reception apparatus of a base station according to the first embodiment of the present invention.

FIG. 8 illustrates a reception apparatus of a base station according to the first embodiment of the present invention.

Referring to FIG. 8, a CQI reception controller 801 receives, from a data reception controller 804, information indicating whether a terminal transmits uplink data, in order to determine whether CQI has been transmitted from the corresponding terminal. A PUSCH receiver 806 receives CQI and uplink data time-multiplexed before being transmitted. A demultiplexer 805 demultiplexes the received time-multiplexed CQI and uplink data, and delivers CQI and packet data to a CQI information demodulator 802 and a packet data demodulator 803, respectively. A scheduler 807 provides scheduling information to the data reception controller 804 and a scheduling grant generator 808, and the scheduling grant generator 808 generates a scheduling grant based on the scheduling information, and transmits it to the terminal by means of a PDCCH transmitter 809.

In a second embodiment of the present invention, a CQI transmission period of a terminal is previously set, and only when the there is an uplink scheduling grant transmitted to the terminal every CQI transmission period or only when the terminal performs initial transmission on uplink data, the terminal punctures a part of data to insert CQI information therein, and multiplexes the CQI information and uplink data before transmission.

The second embodiment of the present invention is the same as the first embodiment of the present invention in the method of, when there is data to transmit over the uplink, puncturing a part of data to insert CQI information therein and multiplexing the CQI information and uplink data before transmission. However, the second embodiment of the present invention is different from the first embodiment in that it multiplexes the CQI information and uplink data only when it receives a scheduling grant. That is, the second embodiment of the present invention permits transmission of CQI information only when the packet data undergoes its initial transmission.

If some of resources allocated for packet data transmission are allocated for CQI transmission, the resources for data transmission reduces, causing a possible degradation of data quality. However, when data undergoes its initial transmission, the base station, taking it into account, selects the amount of transmission resources and a Modulation and Coding Scheme (MCS) level for scheduling so that no quality degradation may occur. Further, in LTE, since the uplink uses synchronous Hybrid Automatic Repeat reQuest (HARQ), it is difficult to change the amount of transmission resource and/or the MCS level during retransmission. Therefore, transmitting CQI during initial transmission of data is easier than transmitting CQI at retransmission time.

Figure 9:
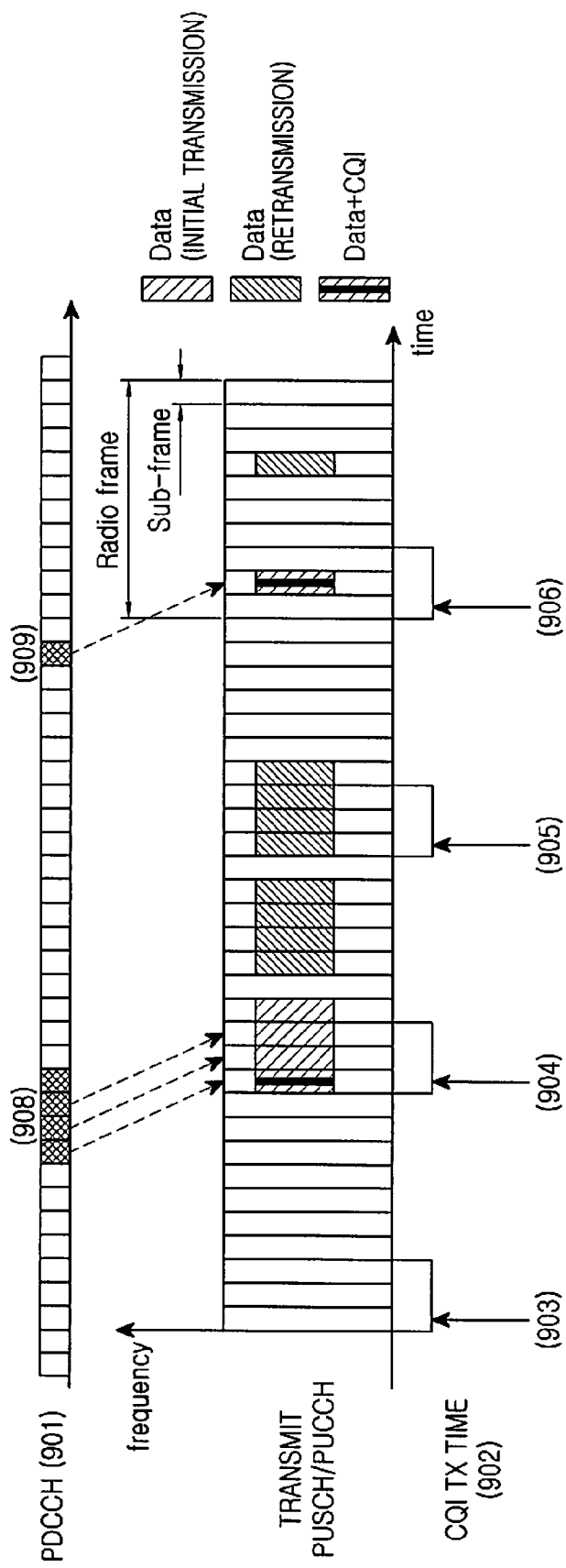
FIG. 9 is a diagram illustrating a CQI transmission method according to a second embodiment of the present invention.

FIG. 9 illustrates a CQI transmission method according to the second embodiment of the present invention.

Referring to FIG. 9, resource allocation information for uplink packet data transmission is transmitted over PDCCH 901. A terminal transmits data using resources allocated after a lapse of predetermined time, since it needs the time required for generating and transmitting data after receiving the PDCCH. It is assumed in FIG. 9 that 3 TTIs 903, 904, 905, 906, are the time required for data generation. When an uplink scheduling grant 908 is transmitted over PDCCH, data undergoes its initial transmission as shown by the hatched region, and when retransmission is needed, the retransmission is performed at a retransmission time(s) as shown by the finely-hatched regions. Since it is assumed herein that synchronous HARQ is used, the retransmission time(s) is fixed to the time a predetermined number of TTIs have elapsed from the initial transmission time, and it is assumed as 5 TTIs in FIG. 9. Further, in FIG. 9, since the CQI transmission period 902 is assumed as 10 TTIs, the terminal determines whether it will make CQI transmission every $10^{th}$ sub-frame.

When there is no uplink scheduling grant even at a CQI transmission time as shown by 903, the terminal transmits no CQI, and only when a valid uplink scheduling grant is received at a corresponding CQI transmission time as shown by 904, the terminal transmits CQI. The terminal transmits no CQI even when it performs data retransmission at a CQI transmission time as shown by 905.

The second embodiment of the present invention also defines a periodic CQI transmission period and a CQI transmission-available interval in determining the CQI transmission time, and multiplexes packet data and CQI before transmission as shown by 909 when it receives a scheduling grant within the CQI transmission-available interval. In FIG. 9, the CQI transmission-available interval is assumed to have 3 sub-frames, including a corresponding sub-frame of the CQI transmission time. The second embodiment of the present invention is equal to the first embodiment of the present invention in calculating a CQI transmission time using the CQI transmission period and the CQI transmission-available interval.

Figure 10:
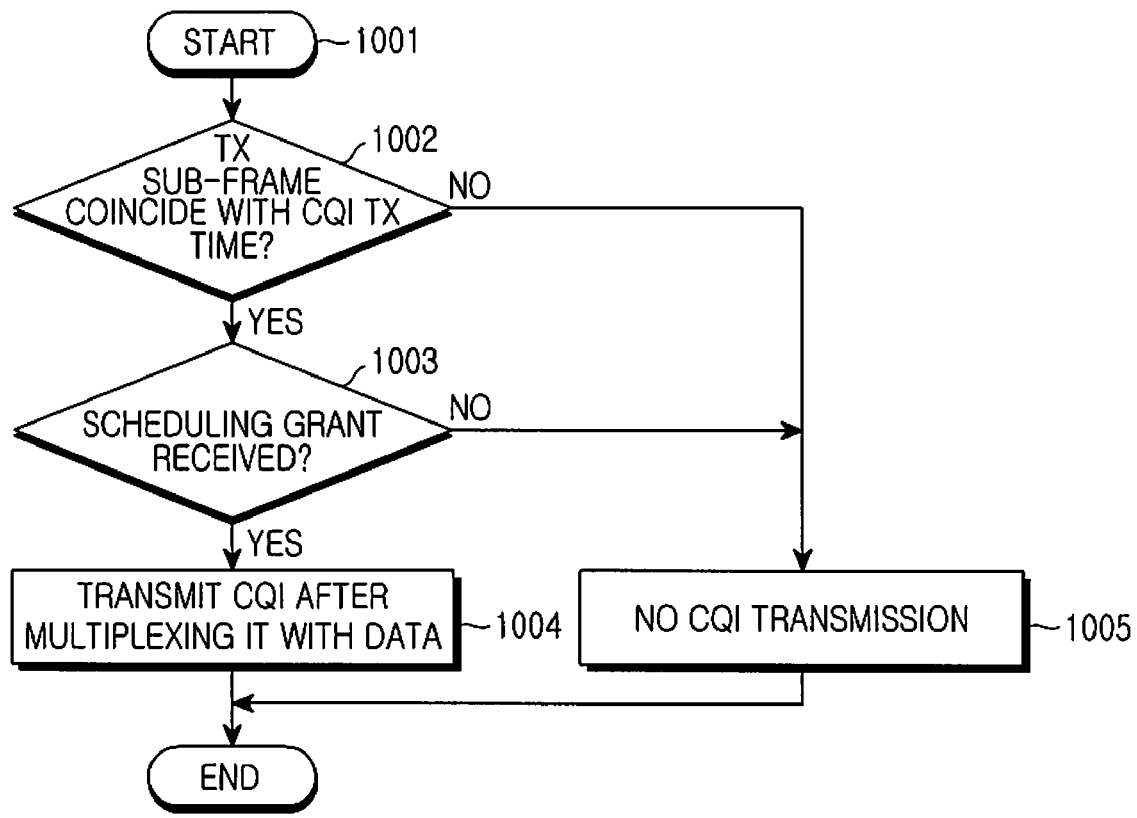
FIG. 10 is a diagram illustrating an operating procedure of a terminal according to the second embodiment of the present invention.

FIG. 10 illustrates an operating procedure of a terminal according to the second embodiment of the present invention.

Referring to FIG. 10, after the methodology begins in step 1001, a terminal determines in step 1002 whether the time it desires to transmit CQI is coincident with a predetermined CQI transmission time. The coincidence between the desired transmission time and the CQI transmission time is determined using the foregoing CQI transmission time decision method. If it is determined that the desired transmission time is coincident with the predetermined CQI transmission time, the terminal proceeds to step 1003 where it determines whether it has received a valid scheduling grant at a sub-frame of the corresponding CQI transmission time. Upon receipt of the valid scheduling grant, the terminal proceeds to step 1004 where it multiplexes data and CQI before transmission. However, if the desired transmission time is not coincident with the predetermined CQI transmission time or if a scheduling grant for uplink data transmission is not received, the terminal proceeds to step 1005 where it does not perform CQI transmission.

Figure 11:
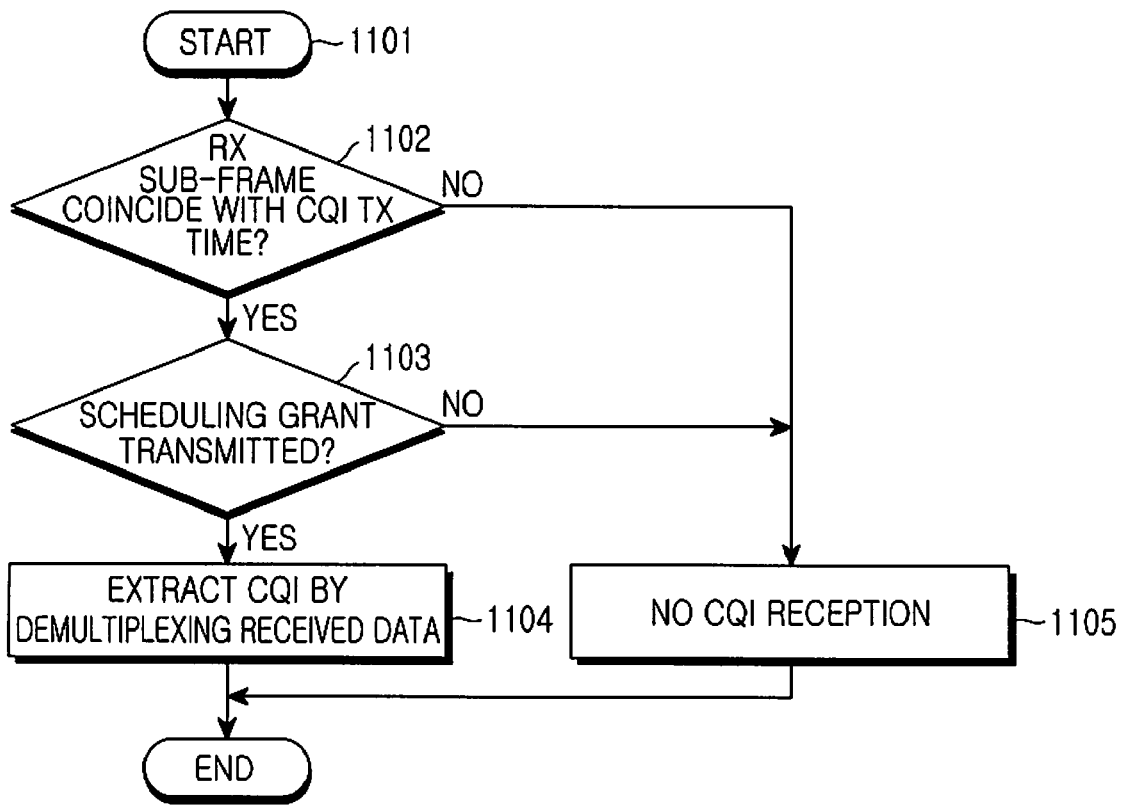
FIG. 11 is a diagram illustrating an operating procedure of a base station according to the second embodiment of the present invention.

FIG. 11 illustrates an operating procedure of a base station according to the second embodiment of the present invention.

Referring to FIG. 11, after the methodology begins in step 1101, a base station determines in step 1102 whether the current sub-frame is coincident with a CQI reception time. Since the CQI transmission time at the terminal is equal to the CQI reception time at the base station, the coincidence between the current sub-frame and the CQI reception time is determined using the foregoing CQI transmission time decision method of the terminal. When the sub-frame is coincident with the CQI transmission time of the terminal, the base station determines in step 1103 whether it has transmitted a valid scheduling grant. If it has transmitted a valid scheduling grant, the base station proceeds to step 1104 where it receives uplink data from the terminal and demultiplexes the received uplink data to extract CQI. However, if the current sub-frame is not coincident with the CQI transmission time of the terminal or if the base station has transmitted no scheduling grant for uplink data transmission, the base station proceeds to step 1105 where it receives no CQI.

Figure 12:
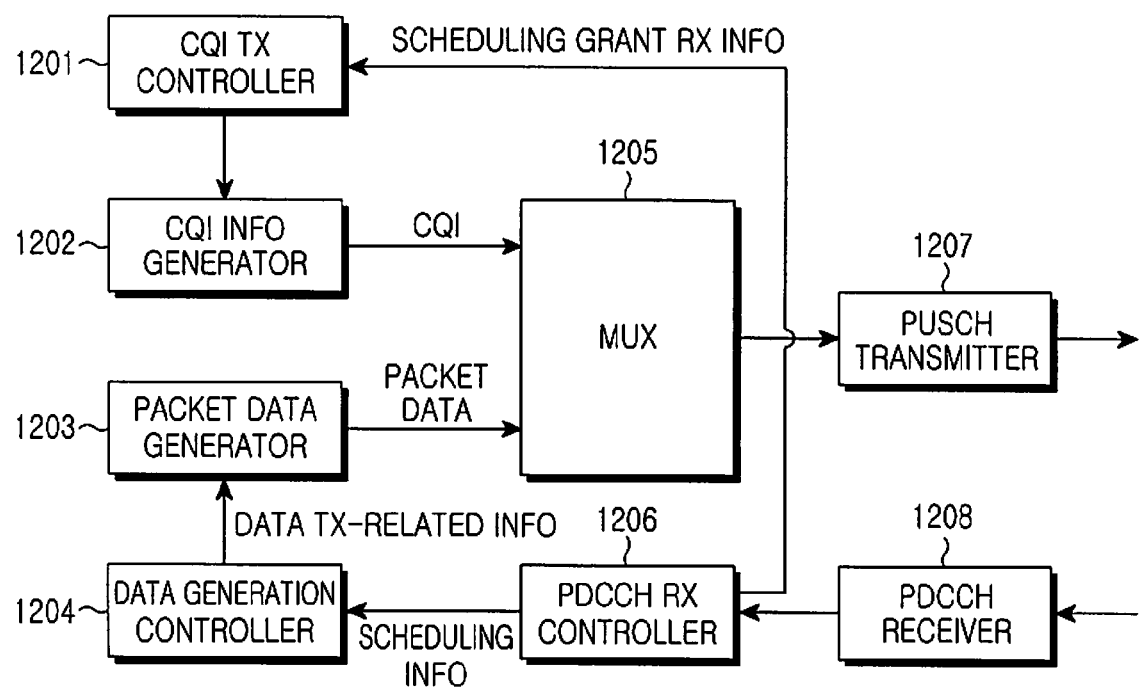
FIG. 12 is a diagram illustrating a transmission apparatus of a terminal according to the second embodiment of the present invention.

FIG. 12 illustrates a transmission apparatus of a terminal according to the second embodiment of the present invention.

Referring to FIG. 12, a CQI transmission controller 1201 receives information indicating reception/non-reception of a scheduling grant from a PDCCH reception controller 1206 in order to determine whether it has received a scheduling grant at a CQI transmission time. A CQI information generator 1202, under the control of the CQI transmission controller 1201, generates CQI and provides it to a multiplexer 1205. A packet data generator 1203, under the control of a data generation controller 1204, generates packet data and delivers it to the multiplexer 1205. The multiplexer 1205 time-multiplexes the CQI and packet data, and transmits the result by means of a PUSCH transmitter 1207. A PDCCH receiver 1208 receives data over PDCCH, and provides the received data to the PDCCH reception controller 1206, and the PDCCH reception controller 1206 extracts scheduling information from the data provided from the PDCCH receiver 1208, and provides the extracted scheduling information to the data generation controller 1204.

Figure 13:
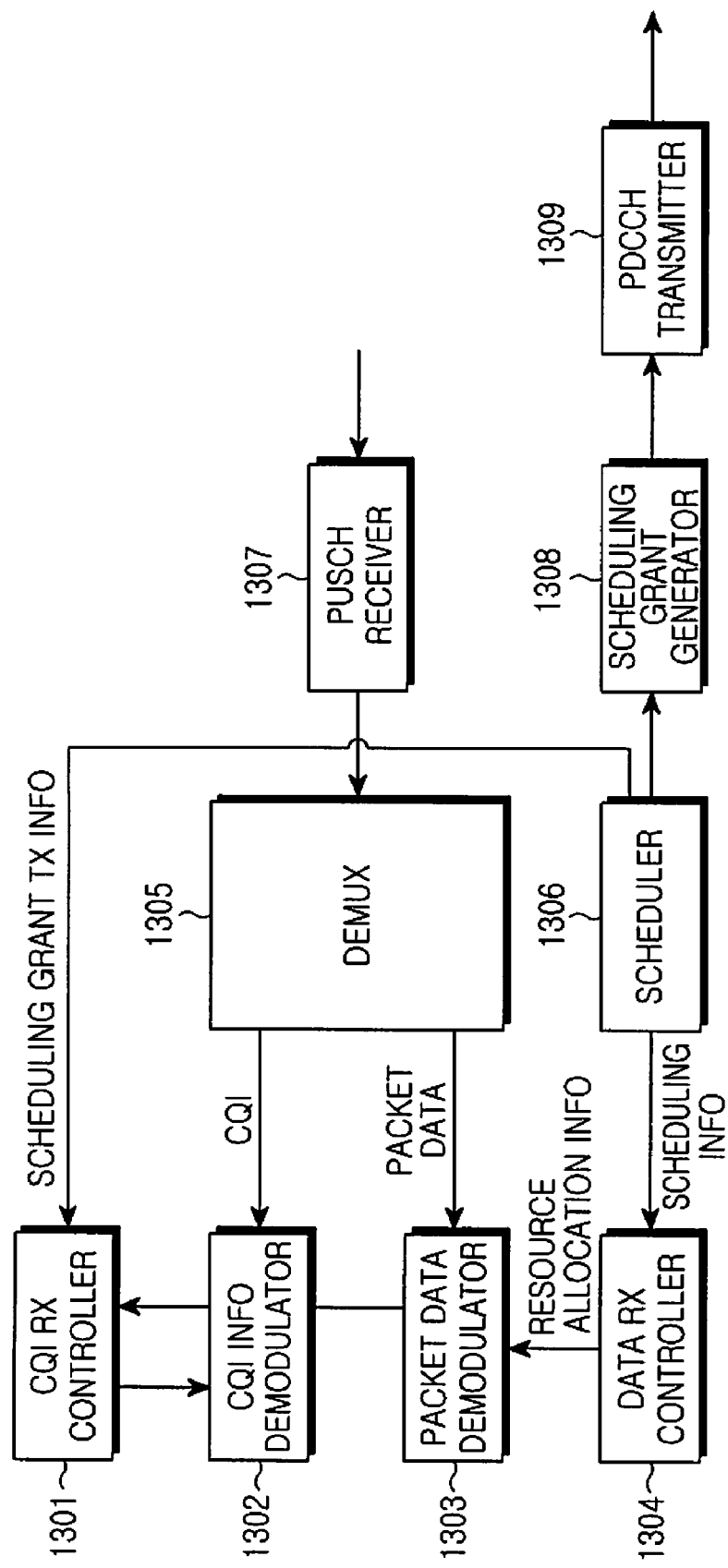
FIG. 13 is a diagram illustrating a reception apparatus of a base station according to the second embodiment of the present invention.

FIG. 13 illustrates a reception apparatus of a base station according to the second embodiment of the present invention.

Referring to FIG. 13, a CQI reception controller 1301 receives information indicating transmission/non-transmission of a scheduling grant from a scheduler 1306 in order to determine whether CQI has been transmitted from a terminal. A PUSCH receiver 1307 receives CQI and uplink data time-multiplexed before being transmitted. A demultiplexer 1305 demultiplexes the received time-multiplexed CQI and uplink data, and provides CQI and packet data to a CQI information demodulator 1302 and a packet data demodulator 1303, respectively. The scheduler 1306 provides scheduling information to a data reception controller 1304 and a scheduling grant generator 1308, and the scheduling grant generator 1308 generates a scheduling grant based on the scheduling information provided from the scheduler 1306, and transmits the generated scheduling grant to the terminal by means of a PDCCH transmitter 1309.

A third embodiment of the present invention determines whether to make CQI transmission based on occurrence of uplink data, reception of an uplink scheduling grant, initial transmission indication of data, and/or previous CQI transmission record. That is, the terminal multiplexes CQI and packet data before transmission only (i) when uplink data has occurred, (ii) when it has received an uplink scheduling grant, and/or (iii) when no CQI transmission has been made for a particular interval while data undergoes its initial transmission.

Figure 14:
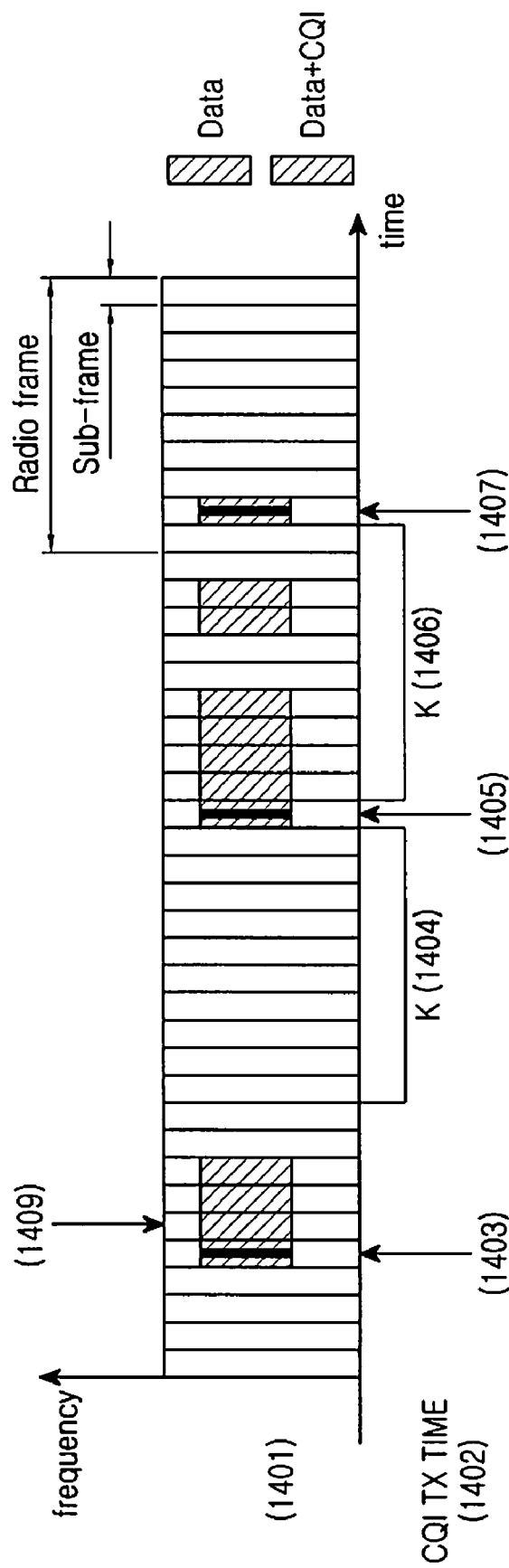
FIG. 14 is a diagram illustrating CQI transmission according to a third embodiment of the present invention.

FIG. 14 illustrates CQI transmission 1401 according to the third embodiment of the present invention. Like the first embodiment of the present invention, the third embodiment of the present invention shown FIG. 14 transmits CQI when uplink data transmission occurs at a CQI transmission time 1402.

As illustrated in FIG. 14, a terminal always transmits CQI together with packet data during initial transmission of uplink data as shown by 1403. Next, the terminal determines whether uplink data transmission has occurred, at every sub-frame. Though uplink data transmission occurs even at the next sub-flame 1404, since there is no need for the CQI information to be transmitted at every sub-frame, the terminal transmits no CQI at 1404. To this end, the terminal is adapted to transmit no CQI when it has ever transmitted CQI during K previous sub-frame intervals in advance of the current sub-frame. Therefore, according to the third embodiment of the present invention, in the case of FIG. 14 when K=10, even though every sub-frame has uplink data to transmit, the terminal transmits CQI only at the $10^{th}$ sub-frame.

There is uplink data to transmit even at 1405, and in this case, the terminal multiplexes the data with CQI before transmission, since there was no CQI transmission during the 10 previous sub-frames 1404. Similarly, even at 1407, the terminal transmits again CQI since there is no CQI transmission during K previous sub-frames 1406. Herein, the parameter K can be provided to the terminal using a fixed value, or using upper layer signaling.

Figure 15:
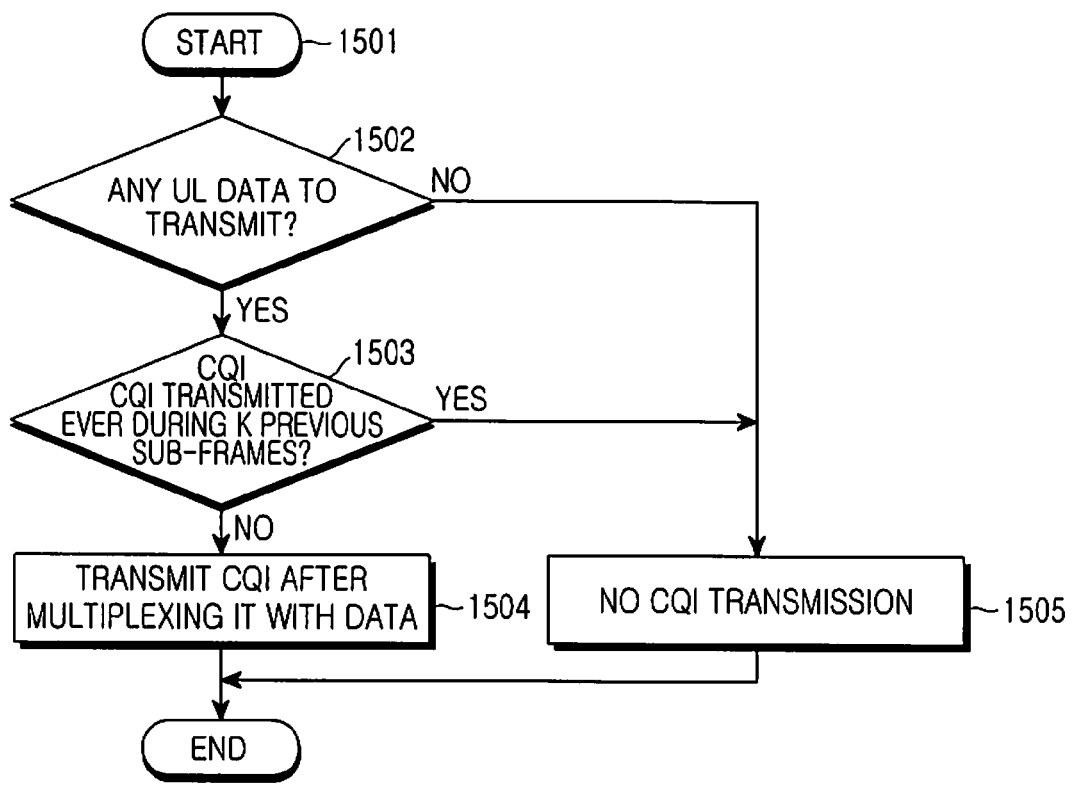
FIG. 15 is a diagram illustrating an operating procedure of a terminal according to the third embodiment of the present invention.

FIG. 15 illustrates an operating procedure of a terminal according to the third embodiment of the present invention.

Referring to FIG. 15, after the methodology begins in block 1501, a terminal determines in step 1502 whether there is any uplink data to transmit. If there is any uplink data to transmit, the terminal proceeds to step 1503 where it determines if CQI has ever been transmitted during K previous sub-frames. If no CQI has been transmitted, the terminal proceeds to step 1504 where it multiplexes the data and CQI before transmission. However, if there is no uplink data to transmit, or if CQI has never been transmitted during K previous sub-frames, the terminal proceeds to step 1505 where it performs no CQI transmission.

Figure 16:
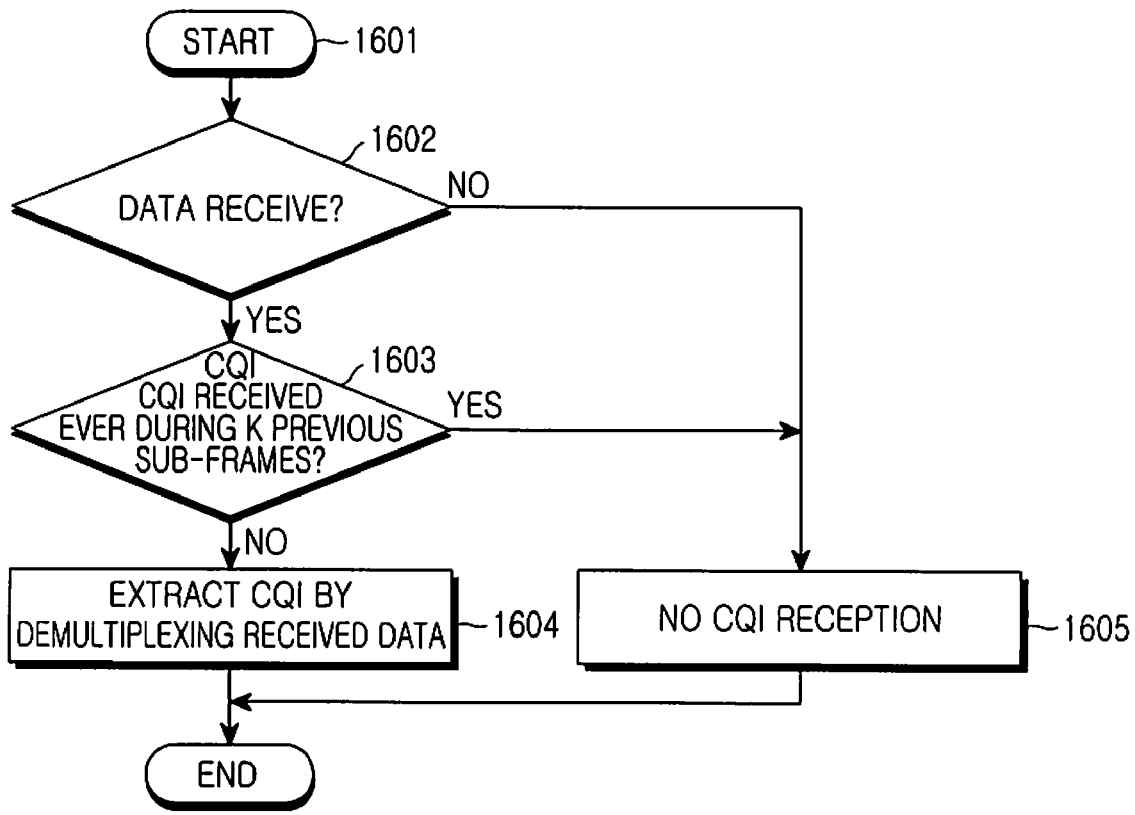
FIG. 16 is a diagram illustrating an operating procedure of a base station according to the third embodiment of the present invention.

FIG. 16 illustrates an operating procedure of a base station according to the third embodiment of the present invention.

Referring to FIG. 16, after the methodology begins in block 1601, a base station determines in step 1602 whether uplink data has been received from a corresponding terminal. If data reception has occurred, the base station proceeds to step 1603 where it determines whether it has ever received CQI from the corresponding terminal during K previous sub-frames. If it has never received CQI, the base station proceeds to step 1604 where it demultiplexes the data received from the terminal to extract CQI. However, if there is no uplink data received from the terminal, or if it has ever received CQI during K previous sub-frame, the base station proceeds to step 1605 where it does not perform CQI reception.

Although the third embodiment of the present invention determines herein whether to make CQI transmission using the previous CQI transmission record only when there is uplink data to transmit, like the first embodiment of the present invention, it may determine whether to make CQI transmission using the previous CQI transmission record only when the scheduling grant is valid and/or when data undergoes its initial transmission, like the second embodiment of the present invention.

Since the transmission/reception apparatus according to the third embodiment of the present invention can be realized using the transmission/reception apparatus according to the first or second embodiment of the present invention, a detailed drawing and description thereof will be omitted.

As is apparent from the foregoing description, the present invention determines whether to make CQI transmission at the periodic CQI transmission time, based on transmission/non-transmission of uplink data, reception/non-reception of an uplink scheduling grant, and/or initial transmission indication of data. In this manner, the present invention can minimize the resources required for CQI transmission in the system that time-multiplexes CQI information with packet data before transmission.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting a Channel Quality Indicator (CQI) in a communication system, the method comprising:
   determining, by a terminal, whether there is any uplink data to transmit to a base station, when a CQI transmission time arrives according to a predetermined CQI transmission period;
   if there is uplink data to transmit, determining whether the CQI has ever been transmitted during a predetermined number of previous sub-frames including a sub-frame corresponding to the CQI transmission time, and when the CQI has never been transmitted during the predetermined number of previous sub-frames, puncturing a part of the uplink data to insert the CQI therein, multiplexing the inserted CQI with the uplink data, and transmitting the multiplexed CQI and uplink data; and
   if there is no uplink data to transmit, waiting until a next CQI transmission time without transmitting the CQI.

2. The method of claim 1, wherein determining whether there is any uplink data to transmit comprises:
   determining whether there is any uplink data to transmit during a plurality of sub-frames including a sub-frame corresponding to the CQI transmission time.

3. The method of claim 1, wherein transmitting the multiplexed CQI and uplink data comprises:
   when the uplink data is initial transmission data, puncturing a part of the uplink data to insert the CQI therein, and multiplexing the inserted CQI with the uplink data.

4. The method of claim 1, wherein transmitting the multiplexed CQI and uplink data comprises:
   when a scheduling grant for the uplink data is received, puncturing a part of the uplink data to insert the CQI therein, and multiplexing the inserted CQI with the uplink data.

5. A method for receiving a Channel Quality Indicator (CQI) in a communication system, the method comprising:
   determining, by a base station, whether there is any uplink data to receive from a terminal, when a CQI reception time arrives according to a predetermined CQI transmission period;
   if there is uplink data to receive, receiving the uplink data from the terminal, determining whether the CQI has ever been received during a predetermined number of previous sub-frames including a sub-frame corresponding to the CQI reception time, and when the CQI has never been received during the predetermined number of the previous sub-frames, demultiplexing the received uplink data to extract the CQI; and
   if there is no uplink data to transmit, waiting until a next CQI transmission time without transmitting the CQI.

6. The method of claim 5, wherein determining whether there is any uplink data to receive comprises:
   determining whether there is any uplink data to receive, during a plurality of sub-frames including a sub-frame corresponding to the CQI reception time.

7. The method of claim 5, wherein demultiplexing the received uplink data to extract the CQI comprises:
   when the received uplink data is initial transmission data, demultiplexing the received uplink data to extract the CQI.

8. The method of claim 5, wherein demultiplexing the received uplink data to extract the CQI comprises:
   when a scheduling grant for the received uplink data is transmitted to the terminal, demultiplexing the received uplink data to extract the CQI.

9. A terminal apparatus for transmitting a Channel Quality Indicator (CQI) in a communication system, the apparatus comprising:
   a packet data generator for generating packet data according to scheduling information received from a base station;
   a CQI information generator for generating a CQI; and
   a multiplexer for puncturing a part of the packet data to insert the CQI received from the CQI information generator therein, multiplexing the inserted CQI with the packet data received from the packet data generator, and transmitting the multiplexed result to the base station;
   wherein when a CQI transmission time arrives according to a predetermined CQI transmission period, the CQI information generator determines whether there is any uplink data to transmit to the base station, there is uplink data to transmit, determines whether the CQI has ever been transmitted during a predetermined number of previous sub-frames including a sub-frame corresponding to the CQI transmission time, outputs the generated CQI when the CQI has never been transmitted during the predetermined number of previous sub-frames, and if there is no uplink data to transmit, waits until a next CQI transmission time without output the generated CQI.

10. The terminal apparatus of claim 9, wherein the CQI information generator determines whether there is any uplink data to transmit, during a plurality of sub-frames including a sub-frame corresponding to the CQI transmission time.

11. The terminal apparatus of claim 9, wherein the CQI information generator outputs the generated CQI, when the uplink data is initial transmission data.

12. The terminal apparatus of claim 9, wherein the CQI information generator outputs the generated CQI, when a scheduling grant for the uplink data is received from the base station.

13. A base station apparatus for receiving a Channel Quality Indicator (CQI) in a communication system, the apparatus comprising:
- a demultiplexer for demultiplexing multiplexed data received from a terminal to extract a CQI;
- a data reception controller for controlling reception of the data according to scheduling information generated by a scheduler;
- a packet data demodulator for demodulating packet data received from the demultiplexer under control of the data reception controller;
- a CQI reception controller for controlling demodulation of the CQI extracted by the demultiplexer; and
- a CQI information demodulator for demodulating the CQI received from the demultiplexer under control of the CQI reception controller;
- wherein when a CQI reception time arrives according to a predetermined CQI transmission period, the CQI reception controller determines whether there is any uplink data to receive from a terminal, there is uplink data to receive, determines whether the CQI has ever been received during a predetermined number of previous sub-frames including a sub-frame corresponding to the CQI reception time, controls the CQI information demodulator to demodulate the CQI when the CQI has never been received during the predetermined number of previous sub-frames and if there is no uplink data to receive, controls the CQI information demodulator to wait until a next CQI transmission time without demodulating the CQI.

14. The base station apparatus of claim 13, wherein the CQI reception controller determines whether there is any uplink data to receive, during a plurality of sub-frames including a sub-frame corresponding to the CQI reception time.

15. The base station apparatus of claim 13, wherein the CQI reception controller controls the CQI information demodulator to demodulate the CQI, when the received uplink data is initial transmission data.

16. The base station apparatus of claim 13, wherein the CQI reception controller receives scheduling grant transmission information from the scheduler, and controls the CQI information demodulator to demodulate the CQI, when a scheduling grant for the received uplink data is transmitted to the terminal according to the scheduling grant transmission information.

* * * * *